US008000699B2

(12) United States Patent
Ghai

(10) Patent No.: US 8,000,699 B2
(45) Date of Patent: Aug. 16, 2011

(54) LIGHTWEIGHT COMMUNICATIONS PROTOCOL FOR REDUCING WIRELESS DATA TRANSACTIONS IN MOBILE SUBSCRIBER SESSIONS

(75) Inventor: Rajat Ghai, Sandwich, MA (US)

(73) Assignee: Starent Networks LLC, Wilmington, DE (US)

( * ) Notice: Subject to any disclaimer, the term of this patent is extended or adjusted under 35 U.S.C. 154(b) by 144 days.

(21) Appl. No.: 11/270,725

(22) Filed: Nov. 9, 2005

(65) Prior Publication Data

US 2007/0104125 A1 May 10, 2007

(51) Int. Cl.
*H04W 24/00* (2009.01)
(52) U.S. Cl. ........ 455/424; 455/423; 370/338; 370/328; 709/201; 709/203; 709/220; 709/227; 709/230
(58) Field of Classification Search .................. 455/424, 455/418, 414.1, 414.2, 423; 370/338, 328; 709/201, 203, 220, 227, 230
See application file for complete search history.

(56) References Cited

U.S. PATENT DOCUMENTS

| 6,738,821 B1 * | 5/2004 | Wilson et al. | 709/230 |
| 7,254,137 B2 * | 8/2007 | Civanlar et al. | 370/401 |
| 2002/0184373 A1 * | 12/2002 | Maes | 709/228 |
| 2005/0015761 A1 * | 1/2005 | Chang et al. | 717/174 |
| 2007/0263565 A1 * | 11/2007 | Roy | 370/328 |
| 2009/0193069 A1 * | 7/2009 | Alexander et al. | 709/203 |
| 2010/0138520 A1 * | 6/2010 | Gallant | 709/220 |

OTHER PUBLICATIONS

International Search Report and Written Opinion issued for International Patent Application No. PCT/US2006/043396.

* cited by examiner

*Primary Examiner* — Ajit Patel
*Assistant Examiner* — Khai M Nguyen
(74) *Attorney, Agent, or Firm* — Wilmer Cutler Pickering Hale and Dorr LLP

(57) ABSTRACT

A method and system are provided for reducing the number of wireless transactions between an application server and mobile subscribers in a wireless communications system. The communications system includes a plurality of wireless mobile subscribers communicating with network devices via the application server. Each of the mobile subscribers includes a lightweight client, and the application server includes an alias for each mobile subscriber. For each session between a mobile subscriber and a network device: the application server receives a communication from the network device intended to be processed at a client residing on the mobile subscriber in accordance with a given protocol. The system distributes the processing of the communication between the lightweight client on the mobile subscriber and the alias for the mobile subscriber on the application server to reduce the processing performed by the lightweight client and the number of wireless transactions between the mobile subscriber and the application server.

20 Claims, 4 Drawing Sheets

8Bytes 2Bytes 2Bytes    2Bytes   Var. Size

LIGHTWEIGHT COMMUNICATIONS PROTOCOL FOR REDUCING WIRELESS DATA TRANSACTIONS IN MOBILE SUBSCRIBER SESSIONS

BACKGROUND OF THE INVENTION

The present invention relates generally to mobile communications networks and, more particularly, to a lightweight communications protocol for reducing the number of over-the-air data transactions in mobile subscriber sessions.

The popularity of SIP (Session Initiation Protocol) as a communication protocol has greatly increased in recent years. SIP is modeled after HTTP (HyperText Transfer Protocol), the underlying protocol used by the World Wide Web, and is widely expected to revolutionize telecommunications similar to the way HTTP revolutionized the web. SIP has roots in the wire line broadband world where the driving requirement was to create a loose and flexible protocol that was access independent and generic. Because of the flexible nature of the protocol, standard bodies have begun adopting SIP as a communication protocol on user endpoints. Bandwidth requirements and transaction rates however have not been emphasized.

Mobile networks are undergoing the transformation and migration from the 2G standard to the 3G standard. 3G enables high speed data access to the mobile endpoints, thus opening the doors to many multimedia services. However, although 3G offers high speed data access, it is heavily oversubscribed, i.e., the users/channel ratio is very high (greater than 100 in some markets compared to 5 typically in wireline networks). Heavy oversubscription is primarily caused by the high startup cost in setting up a mobile access network. This high oversubscription significantly reduces the effective bandwidth available to mobile users and network throughput.

By way of example, a typical SIP call flow for VIM (voice instant messaging) is now described. The bandwidth requirements and transaction exchange rate is quantified for a typical VIM session setup and an instant message delivery.

A SIP client has to register with a SIP registrar/server if it wishes to be reached. The registration is valid for a configured time (e.g., one hour) and has the client's network address included in the registration. If at anytime the client changes its network address (e.g., as a result of roaming), it has to re-register with its registrar.

FIG. 1 shows a typical call flow of a SIP client registering with a SIP registrar or server. This procedure is invoked if any change in the mobile network address is made or after some configured time period ends, whatever comes first. Exemplary transactions in a registration procedure shown below require 1 KB.

```
Via: SIP/2.0/TLS 10.0.33.241:5061;branch=z9hG4bKnashds7
  Max-Forwards: 70
  From: XXXXX <sips:XXXXX@10.0.33.241>;tag=a73kszlfl
  To: XXXXX <sips:XXXXX@10.0.33.241>
  Call-ID: 1j9FpLxk3uxtm8tn@10.0.33.241
  CSeq: 1 REGISTER
  Contact: mailto:XXXXX@vzw.com
  Authorization: Digest username="XXXXX", realm="boston.vzw.com",
     qop="auth", nonce="1cec4341ae6cbe5a359ea9c8e88df84f",
     opaque="", uri="sips:ss2.vzw.com",
     response="71ba27c64bd01de719686aa4590d5824"
  Content-Length: 0
SIP/2.0 200 OK
  Via: SIP/2.0/TLS 10.0.33.241:5061;branch=z9hG4bKnashds7
  ;received=10.0.33.241
```

```
  From: XXXXX <sips:XXXXX@10.0.33.241>;tag=a73kszlfl
  To: XXXXX <sips:XXXXX@10.0.33.241>;tag=34095828jh
  Call-ID: 1j9FpLxk3uxtm8tn@10.0.33.241
  CSeq: 1 REGISTER
  Contact: <sips:XXXXX@10.0.33.241>;expires=3600
  Contact: <mailto:XXXXX@vzw.com>;expires=4294967295
  Content-Length: 0
```

Once the registration is performed, the SIP client can transmit and receive messages over the network. FIG. 2 shows an exemplary call flow for a SIP client originating a VIM message. In this example, the SIP call flow takes a total of 5.25K Bytes and 9 SIP transactions to deliver one VIM message.

A fully loaded SIP application server chassis can typically serve 20,000 media ports. Using the standard oversubscription model, such a configuration can serve up to 2,000,000 subscribers. At a 0.02 erlang traffic per subscriber and an average individual message of 10 seconds, the total number of VIM messages the SIP application server will handle is 24,000,000/day or 1,000,000/hour. Using the results from the SIP call flow of 9 SIP messages per VIM, such a configuration will result in 9,000,000 SIP transactions per hour utilizing a total bandwidth of 5.25 G Bytes of SIP message data (overhead). These numbers show that extending SIP to mobile terminals is not efficient in mobile networks; hence improvements for increasing throughput in such an environment would be desirable.

BRIEF SUMMARY OF EMBODIMENTS OF THE INVENTION

In accordance with one or more embodiments of the invention, a method and system are provided for reducing the number of wireless transactions between an application server and mobile subscribers in a wireless communications system. The communications system includes a plurality of wireless mobile subscribers communicating with network devices via the application server. Each of the mobile subscribers includes a lightweight client, and the application server includes an alias for each mobile subscriber. For each session between a mobile subscriber and a network device: the application server receives a communication from the network device intended to be processed at a client residing on the mobile subscriber in accordance with a given protocol. The system distributes the processing of the communication between the lightweight client on the mobile subscriber and the alias for the mobile subscriber on the application server to reduce the processing performed by the lightweight client and the number of wireless transactions between the mobile subscriber and the application server.

These and other features and advantages of the present invention will become readily apparent from the following detailed description, wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense, with the scope of the application being indicated in the claims.

DESCRIPTION OF THE PREFERRED EMBODIMENTS

Figure 3:
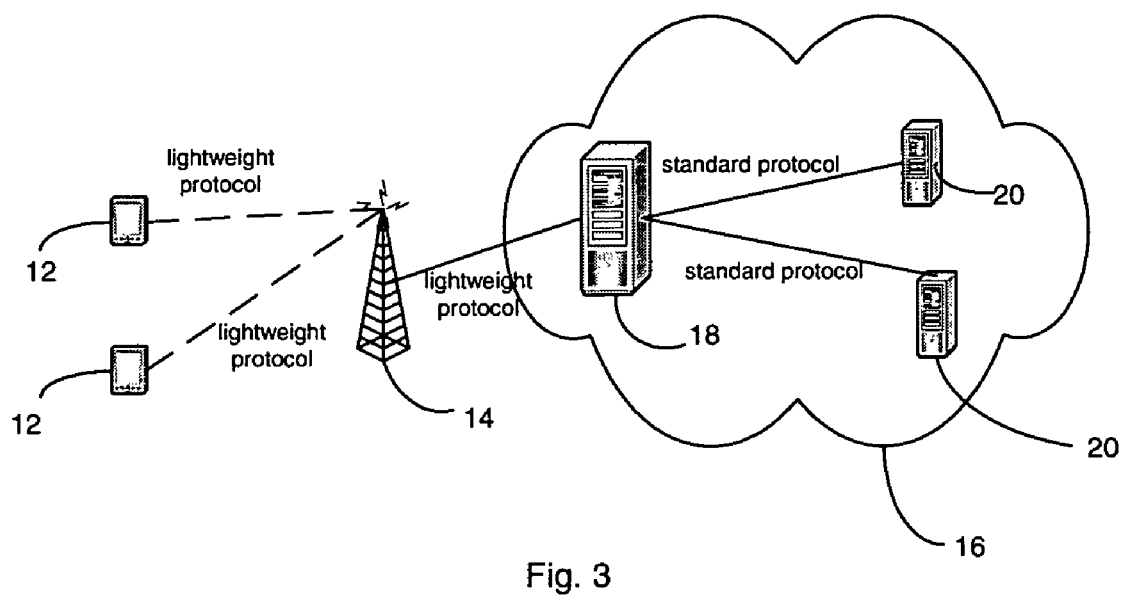
FIG. 3 illustrates a mobile communications system in accordance with one or more embodiments of the invention.

FIG. 3 illustrates a wireless communications system 10 in accordance with one or more embodiments of the invention. The system includes a plurality of mobile subscribers 12 (also known as mobile devices or mobile nodes). The mobile subscribers 12 may be any suitable device that is capable of communicating with a wireless network, such as, e.g., cellular phones, PDAs (personal digital assistants), mobile PCs (personal computers) with modems, and other mobile computing devices. The mobile subscribers communicate with the wireless network through a plurality of base stations 14. The base stations 14 act as the interface between the network and the mobile subscribers 12, in that they convert digital data into radio signals and vice versa. Each of the base stations 14 typically has an associated radio tower or antenna and communicates with various mobile subscribers 12 using radio links. In particular, the base stations 14 can communicate with various mobile subscribers 12 through the modulation and transmission of sets of forward signals, while base stations 14 receive and demodulate sets of reverse signals from various mobile subscribers 12 that are engaged in a wireless network activity (e.g., a telephone call, Web browsing session, interactive gaming, etc.).

A network 16 includes (preferably near an edge thereof) one or more application servers 18, which are used for interconnecting the mobile subscribers 12 and network resources 20, which can be other network devices such as, e.g., network servers and media servers. The application servers 18 communicate with other network devices 20 to provide the mobile subscribers 12 access to a wide variety of applications and services including, e.g., instant messaging, push-to-talk services, interactive gaming, music and video streaming, and voice, video and Web conferencing.

Figure 4:
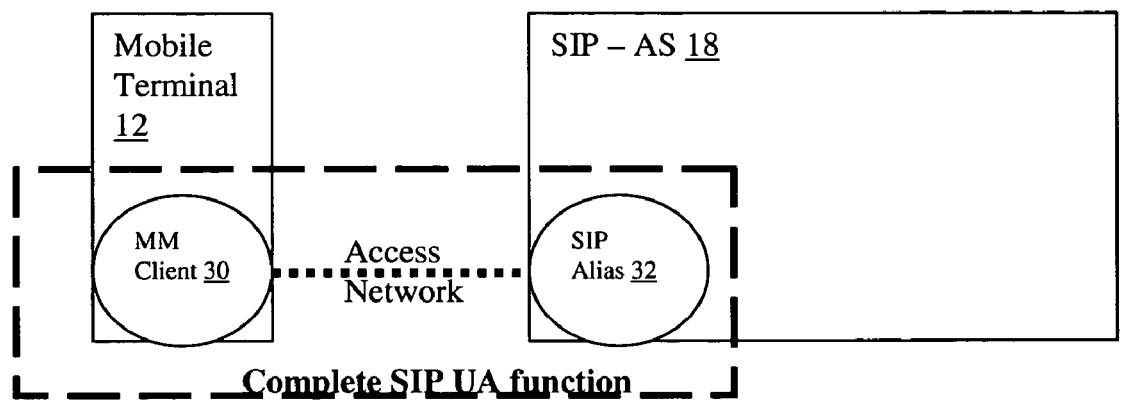
FIG. 4 illustrates the distribution of SIP client functionality between the mobile subscriber and the application server in accordance with one or more embodiments of the invention.

In conventional systems, the application servers and other network devices communicate with the mobile subscribers using SIP as the session control mechanism. In these conventional systems, each mobile subscriber includes a SIP client allowing it to communicate with other SIP devices. In accordance with various embodiments of the invention, as illustrated, e.g., in FIG. 4, the SIP functionality of each mobile subscriber 12 is distributed between the mobile subscriber 12 and the application server 18. In particular, a light MM (multimedia) client 30 is implemented on the mobile subscriber 12, which communicates with an image 32, i.e., alias, of the subscriber implemented in the SIP application server 18. Together, the light client 30 and the subscriber alias 32 complete the SIP endpoint function for the mobile subscriber with respect to the external world (particularly, other devices in the network in a communication session with the mobile subscriber). By distributing the SIP functionality of a mobile subscriber between the mobile subscriber 12 and the application server 18, the mobile subscriber 12 and the application server 18 can communicate using a lightweight protocol, and the number of wireless transactions between the application server 18 and the mobile subscriber 12 can be significantly reduced.

The light client 30 can be implemented in the mobile subscribers 12 using various standards including, e.g., the J2ME (MIDP2.0, JSR 135) standard popular among mobile phones.

A number of advantages can be achieved by distributing the functionality of the SIP client between the mobile subscriber 12 and the application server 18. Throughput is enhanced by reducing the number of SIP messages transmitted over the air. In addition, the light MM client 30 has a smaller footprint on the mobile subscriber 12 since it uses preferably only core application specific code, and there is preferably no need for a SIP stack. Furthermore, the MM client 30 would need fewer CPU cycles as much or most of the SIP function would be delegated to its clone 32 residing at the application server 18. Reducing processing on the mobile subscriber also reduces the power consumed by the mobile subscriber, thereby increasing the time intervals between recharging of the device battery. In addition, the high bandwidth processing architecture of the application server 18 can be leveraged by delegating the non-essential functions to the core network.

Figure 1:
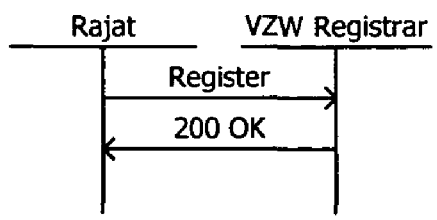
FIG. 1 illustrates an exemplary call flow of a SIP client registering with a SIP registrar/server in accordance with the prior art.
Figure 2:
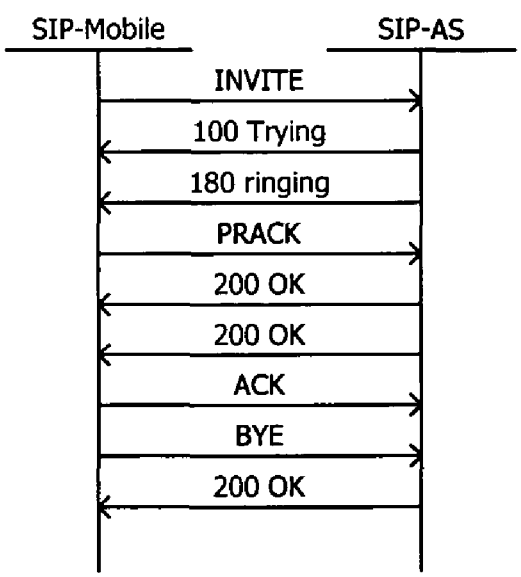
FIG. 2 illustrates an exemplary call flow of a SIP-mobile originating a VIM message in accordance with the prior art.
Figure 5:
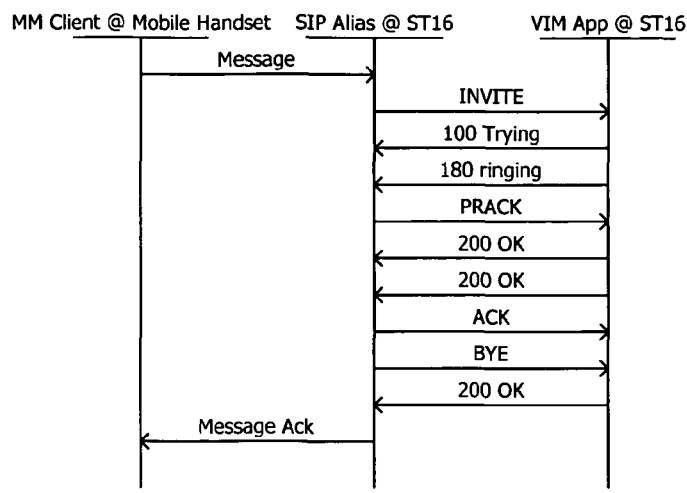
FIG. 5 illustrates an exemplary call flow of a SIP-mobile originating a VIM message in accordance with one or more embodiments of the invention.

FIG. 5 illustrates an exemplary VIM call flow in accordance with one or more embodiments of the invention provided for comparison to the prior art call flow of FIG. 2. As shown, in the FIG. 5 call flow, only two wireless transactions are needed between the mobile subscriber and the application server, unlike the FIG. 2 call flow in which nine transactions are needed to deliver one VIM message.

The MM client can use the Real-Time Transport Protocol (RTP) for the access to the application server. To improve throughput, high RTP packetization intervals could be used with large frame sizes. As an example, using an 8 kbps coder, a frame size of 1400 Bytes could carry >1 sec of voice data. Such a scheme could be very efficient over the standard 20 msec packetization rate that would generate 50 packets for the same 1 sec of voice data.

Figure 6:
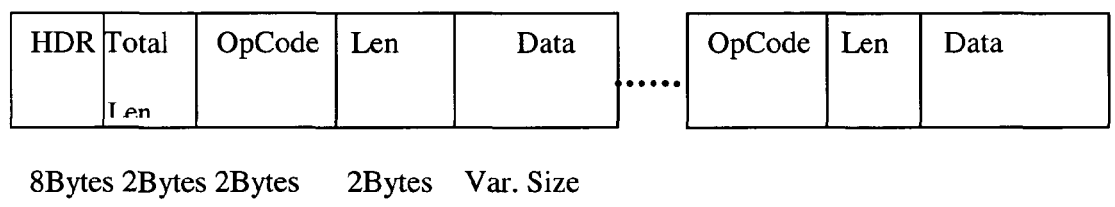
FIG. 6 illustrates the general structure of the lightweight communications protocol between a mobile device client and its SIP alias at a SIP application server in accordance with one or more embodiments of the invention.

The lightweight communication protocol used between the MM client 30 on the mobile subscriber 12 and its SIP alias 32 at the SIP application server 18 is compact and preferably extensible. It can significantly improve application throughput for 3G and other wireless data networks. One possible general structure of the lightweight communication protocol PDU (protocol data unit) is illustrated in FIG. 6. An 8 Byte header can be used containing fixed length fields starting with version number, followed by Application ID etc. Total Len represents the total length of the PDU and can be 2 Bytes wide. OpCode, which can be 2 Byte wide, carries the control instructions, e.g., the "Message" as shown in the call flow above. Many (e.g., 64,000) different types of opcodes can be defined. Len, which is a 2 Byte field, indicates the length of data associated with the OpCode. Data is a variable sized data field following the len. The syntax of this field can be opcode dependent.

An MM client 30 in accordance with one or more embodiments of the invention can be installed on a mobile subscriber 12 by downloading the client 30 from the network. Alternately, the software can be pre-installed on mobile subscribers 12 purchased by system users. Once the mobile subscriber 12 has the client application 30, the system can be optionally configured such that every invocation of the MM client 30 will preferably first check an associated portal to see if it has the most recent version of the software. If not, the portal can alert the client to upgrade the software to a new version.

Although various examples described in the application refer to use of the SIP protocol, it should be understood that the invention is not limited to use with any particular standard protocol, but can be used with a variety of communications protocols including, e.g., the H.323 protocol.

The MM client 30, subscriber alias 32 and associated processes are preferably implemented in software, and accordingly one of the preferred implementations is as a set of instructions (program code) in a code module resident in the random access memory of the respective devices. Until required, the set of instructions may be stored in another computer memory, e.g., in a hard disk drive, or in a removable memory, or downloaded via the Internet or some other computer network. In addition, although the various methods described are conveniently implemented in a device selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

The invention claimed is:

1. In a wireless communications system mobile subscribers wirelessly communicate through application servers for resources from network devices using communication sessions, a method comprising:
   receiving, at the application server, a communication from the network device intended for a Session Initiation Protocol (SIP) client residing on the mobile subscriber;
   processing, at a subscriber alias on the application server, the communication intended for the SIP client residing on the mobile subscriber, where the subscriber alias on the application server performs SIP client functionalities of the mobile subscriber on the application server;
   sending a wireless communication from the subscriber alias to a lightweight client regarding the processing of one or more communications at the subscriber alias; and
   receiving, at the subscriber alias, a wireless communication from the lightweight client with control instructions for performing SIP functionalities that are distributed to the subscriber alias.

2. The method of claim 1 wherein the wireless communications system is a 3G network.

3. The method of claim 1 wherein Session Initiation Protocol (SIP) functionality of the mobile subscriber is distributed between the lightweight client and the subscriber alias forms a SIP endpoint to the network devices.

4. The method of claim 1 wherein said network devices comprise network servers or media servers.

5. The method of claim 1 wherein said mobile subscribers comprise cellular phones, personal digital assistants or mobile personal computers.

6. The method of claim 1, further comprising downloading said lightweight client from said system on each of said mobile subscribers.

7. The method of claim 1 wherein said network device provides said mobile subscriber access to an application or a service in said session, said application or service comprising instant messaging, push-to-talk services, interactive gaming, music streaming, video streaming, voice conferencing, video conferencing, or Web conferencing.

8. A wireless communications system for communicating with a plurality of wireless mobile subscribers, where at least one of said mobile subscribers includes a lightweight client, and for communicating with network devices, wherein communication sessions are formed between mobile subscribers and network devices, the system comprising:
   an application server including:
      an interface on the application server for communicating with a plurality of wireless mobile subscribers and an interface for communicating with devices in the network;
      said application server including a subscriber alias for each lightweight client, wherein the subscriber alias includes Session Initiation Protocol (SIP) functionality of the mobile subscriber on the application server; and
   wherein for a session between a mobile subscriber and a network device:
      the application server receives a communication from the network device intended for a client residing on the mobile subscriber;
      the subscriber alias processes at least one of the communications intended for the client and sends a wireless communication to the lightweight client; and
      the subscriber alias receives a wireless communication from the lightweight client with control instructions for performing SIP functionalities that are distributed to the subscriber alias.

9. The system of claim 8 wherein the wireless communications system is a 3G network.

10. The system of claim 8 wherein Session Initiation Protocol (SIP) functionality of each mobile subscriber is distributed between the lightweight client and the subscriber alias forming a SIP endpoint to the network devices.

11. The system of claim 8 wherein said network devices comprise network servers or media servers.

12. The system of claim 8 wherein said mobile subscribers comprise cellular phones, personal digital assistants or mobile personal computers.

13. The system of claim 8 wherein said lightweight client is downloaded on the at least one of said mobile subscribers.

14. The system of claim 8 wherein said network device provides said mobile subscriber access to an application or a service in said session, said application or service comprising instant messaging, push-to-talk services, interactive gaming, music streaming, video streaming, voice conferencing, video conferencing, or Web conferencing.

15. Logic encoded on one or more tangible media for execution and when executed operable to:
   receive, at a application server, a communication from a network device intended for a Session Initiation Protocol (SIP) client residing on a mobile subscriber in communication with the application server;
   process, at a subscriber alias on the application server, the communication intended for the SIP client residing on the mobile subscriber, where the subscriber alias on the application server performs SIP client functionalities of the mobile subscriber on the application server;
   send a wireless communication from the subscriber alias to a lightweight client regarding the processing of one or more communications at the subscriber alias; and
   receive, at the subscriber alias, a wireless communication from the lightweight client with control instructions for performing SIP functionalities that are distributed to the subscriber alias.

16. The logic of claim 15 wherein the wireless communications system is a 3G network.

17. The logic of claim 15 wherein Session Initiation Protocol (SIP) functionality of each mobile subscriber is distributed between a lightweight client and the alias.

18. The logic of claim 15 wherein said network devices comprise network servers or media servers.

19. The logic of claim 15 wherein said mobile subscribers comprise cellular phones, personal digital assistants or mobile personal computers.

20. The logic of claim 15 wherein said network device provides said mobile subscriber access to an application or a service in said session, said application or service comprising instant messaging, push-to-talk services, interactive gaming, music streaming, video streaming, voice conferencing, video conferencing, or Web conferencing.

* * * * *